US010246760B2

(12) United States Patent
Kool et al.

(10) Patent No.: US 10,246,760 B2
(45) Date of Patent: Apr. 2, 2019

(54) PLATINUM RECOVERY METHODS

(71) Applicant: GENERAL ELECTRIC COMPANY, Schenectady, NY (US)

(72) Inventors: Lawrence B. Kool, Clifton Park, NY (US); Genfa Hu, Parc Mondrian (SG)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 433 days.

(21) Appl. No.: 15/208,030

(22) Filed: Jul. 12, 2016

(65) Prior Publication Data

US 2018/0016660 A1    Jan. 18, 2018

(51) Int. Cl.
*C22B 3/00* (2006.01)
*C22B 7/00* (2006.01)

(52) U.S. Cl.
CPC ............ *C22B 11/046* (2013.01); *C22B 7/007* (2013.01)

(58) Field of Classification Search
CPC ........ C22B 11/04; C22B 11/046; C22B 7/007
USPC ........................................................ 75/715
See application file for complete search history.

(56) References Cited

U.S. PATENT DOCUMENTS

| 5,028,385 | A | 7/1991 | Baldi |
| 5,976,265 | A | 11/1999 | Sangeeta et al. |
| 6,238,743 | B1 | 5/2001 | Brooks |
| 6,379,749 | B2 | 4/2002 | Zimmerman, Jr. et al. |
| 6,428,602 | B1 | 8/2002 | Rosenzweig et al. |
| 6,494,960 | B1 | 12/2002 | Macdonald et al. |
| 6,599,416 | B2 | 7/2003 | Kool et al. |
| 6,758,914 | B2 | 7/2004 | Kool et al. |
| 6,758,985 | B2 | 7/2004 | Brooks |
| 6,833,328 | B1 | 12/2004 | Kool et al. |
| 6,863,738 | B2 | 3/2005 | Kool et al. |
| 8,021,491 | B2 | 9/2011 | Kool et al. |
| 2004/0173057 | A1 | 9/2004 | Fairbourn |
| 2005/0161438 | A1 | 7/2005 | Kool et al. |
| 2013/0160609 | A1 | 6/2013 | Kool et al. |

OTHER PUBLICATIONS

Nagayama, H., et al., "A New Process for Silica Coating," Journal of Electrochemical Society, vol. 135, Issue 8, pp. 2013-2016 (Aug. 1988).

Extended European Search Report and Opinion issued in connection with corresponding EP Application No. 17179856.4 dated Nov. 27, 2017.

*Primary Examiner* — Edward M Johnson
(74) *Attorney, Agent, or Firm* — GE Global Patent Operation; John Darling

(57) ABSTRACT

The present invention is directed to a method for recovery of platinum from a coating on a component, wherein the coating includes platinum aluminide, the method including: contacting the coating on the component with a reagent solution, the reagent solution including a reactive species capable of solubilizing an aluminum salt in water, which results in formation of a platinum-rich residue on the component; separating the platinum-rich residue from the component; and collecting the platinum-rich residue. The reactive species may be hexafluorosilicic acid.

32 Claims, No Drawings

PLATINUM RECOVERY METHODS

FIELD OF THE INVENTION

The present invention is directed to methods of recovery of platinum from coatings containing platinum aluminide (PtAl).

BACKGROUND OF THE INVENTION

This invention relates to methods for recovering platinum from an article or a component coated with a coating containing platinum aluminide.

Modern gas or combustion turbines must satisfy the highest demands with respect to reliability, weight, power, economy, and operating service life. In the development of such turbines, the material selection, the search for new suitable materials, as well as the search for new production methods, among other things, play an important role in meeting standards and satisfying the demand.

The platinum group metals (PGM) or PGMs (platinum, palladium, rhodium, iridium, osmium, and ruthenium) are becoming increasingly important to the global economy. The aviation industry uses precious metals in the manufacture of aircraft engines. Gold and silver, as well as palladium and platinum, are used in the manufacture of different types of aircraft engines. Typically, an aircraft engine has up to 23 parts that contain precious metals. Various aircraft engine parts that use precious metals include vanes, stators, blades, fuel nozzles, fuel manifolds, tobi ducts, and heat exchangers. Whereas parts of an aircraft's engine turbine system and avionics system use gold and silver, the aircraft blades use platinum. This invention relates to the recovery of platinum from used aviation components.

After the life of an aircraft engine is over, the aviation industry can still recover precious metal from aircraft engines and their parts. Until recently, platinum group metals (PGM) were recovered by classical precipitation procedures, which involved many repeated precipitation/re-dissolution stages in order to obtain metal of the desired purity. These processes are extremely tedious and time-consuming, with metal being tied-up in process often for many months.

Yet, recovery of precious metals can account for up to 50 percent of an aircraft engine's recycling value. With respect to platinum aluminide coatings, past methods involved removal of platinum aluminide by dissolving both the aluminum and platinum in strong acids, such as aqua regia. Platinum could then be recovered by treating the acidic solution containing dissolved platinum salts with a neutralizing base, thereby causing the dissolved platinum and aluminum salts to precipitate and be collected. This method has its drawbacks. A neutralization of the acidic solution is required to recover dissolved platinum from the acidic solution, thus adding contaminants to the recovered platinum. Additionally, the aluminum is also dissolved in the acidic solution, further contaminating the purity of the recovered platinum. Accordingly, there is a need for new and improved methods for recovering platinum from engine turbine blades.

SUMMARY OF THE INVENTION

The present invention relates to methods of recovery of platinum from coatings containing platinum aluminide.

Thus, in one embodiment, the invention is directed to a method for recovery of platinum from a coating on a component, wherein the coating includes platinum aluminide, the method including: contacting the coating on the component with a reagent solution, the reagent solution including hexafluorosilicic acid, whereby a platinum-rich residue is formed on the component; separating the platinum-rich residue from the component; and collecting the platinum-rich residue.

The present invention is also directed to a method for recovery of platinum from a coating on a component, wherein the coating includes platinum aluminide, the method including: contacting the coating on the component with a reagent solution by immersing the component in the reagent solution, the reagent solution including hexafluorosilicic acid, whereby a platinum-rich residue is formed on the component; separating the platinum-rich residue from the component by vibratory tumbling of the component; collecting the platinum-rich residue by centrifugation; and drying the platinum-rich residue.

The present invention is also directed to a method for recovery of platinum from a coating on a component, wherein the coating includes platinum aluminide, the method including: contacting the coating on the component with a reagent solution, the reagent solution including a reactive species, wherein the reactive species is capable of solubilizing an aluminum salt in water, whereby a platinum-rich residue is formed on the component; separating the platinum-rich residue from the component; and collecting the platinum-rich residue.

The present invention is further directed to a method for recovery of platinum from a coating on a component, wherein the coating includes platinum aluminide, the method including: contacting the coating on the component with a reagent solution by immersing the component in the reagent solution, the reagent solution including a reactive species, wherein the reactive species is capable of solubilizing an aluminum salt in water, whereby a platinum-rich residue is formed on the component; separating the platinum-rich residue from the component by vibratory tumbling of the component; collecting the platinum-rich residue by centrifugation; and drying the platinum-rich residue.

Advantageously, the methods of the present invention do not require neutralization of the acidic solution of platinum salts, since platinum is not dissolved. Instead, in the methods of the invention, aluminum is leached out of the platinum aluminide coating, leaving a platinum-rich residue (i.e., smut) on the surface of the component. Without being bound to any particular theory, it is believed that this leaching out is a result of the following reaction when hexafluorosilicic acid (i.e., $H_2SiF_6$, also known as "hydrofluosilicic acid" and "fluorosilicic acid") is used:

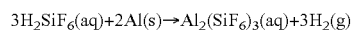

$$3H_2SiF_6(aq) + 2Al(s) \rightarrow Al_2(SiF_6)_3(aq) + 3H_2(g)$$

In the above formula, "(aq)" stands for aqueous, "(s)" for solid, and "(g)" for gas. Similar reactions are believed to take place when a reactive species other than hexafluorosilicic acid is used.

The platinum-rich residue is a loosely-adherent powder that can be easily removed from the component by rubbing or by any of a number of mechanical means. Advantageously, since the platinum is not dissolved in the acidic solution, it can be recovered in high yield without the need to contaminate it with other metals that would precipitate in a neutralization of a solution that contains aluminum and other contaminating methods. The purity of the smut can be as high as 70 weight percent platinum. These and additional features provided by the embodiments discussed herein will be more fully understood in view of the following detailed description.

DETAILED DESCRIPTION OF THE INVENTION

In the following specification and the claims which follow, reference will be made to a number of terms, which shall be defined to have the following meanings.

The singular forms "a", "an", and "the" include plural referents unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about", is not to be limited to the precise value specified. In some instances, the approximating language may correspond to the precision of an instrument for measuring the value.

In an aircraft gas turbine (jet) engine, air is drawn into the front of the engine, compressed by a shaft-mounted compressor, and mixed with fuel. The mixture is combusted, and the resulting hot combustion gases are passed through a turbine mounted on the same shaft. The flow of gas turns the turbine by contacting an airfoil portion of the turbine blade, which turns the shaft and provides power to the compressor. The hot exhaust gases flow from the back of the engine, driving it and the aircraft forwardly.

During operation of gas turbine engines, the temperatures of combustion gases may exceed 3,000° F., considerably higher than the melting temperatures of the metal parts of the engine, which are in contact with these gases. The metal parts that are particularly subject to high temperatures, and thus require particular attention with respect to cooling, are the hot section components exposed to the combustion gases, such as blades and vanes used to direct the flow of the hot gases, as well as other components such as shrouds and combustors.

The hotter the turbine gases, the more efficient is the operation of the jet engine. There is thus an incentive to raise the turbine operating temperature. However, the maximum temperature of the turbine gases is normally limited by the materials used to fabricate the turbine vanes and turbine blades of the turbine. Many approaches have been used to increase the operating temperature limits and operating lives of the airfoils of the turbine blades and vanes.

The metal temperatures can be maintained below melting levels with current cooling techniques by using a combination of improved cooling designs and thermal barrier coatings. In one approach, a protective layer is applied to the airfoil of the turbine blade or turbine vane component, which acts as a substrate. Among the currently known diffusional protective layers are aluminide and platinum aluminide layers. The protective layer protects the substrate against environmental damage from the hot, highly corrosive combustion gases. This protective layer, with no overlying ceramic layer, is useful in intermediate-temperature applications. For higher temperature applications, a ceramic thermal barrier coating layer may be applied overlying the protective layer, to form a thermal barrier coating (TBC) system.

Thermal barrier coatings (TBCs) are well-known ceramic coatings, for example, yttrium stabilized zirconia. Ceramic thermal barrier coatings usually do not adhere optimally directly to the superalloys used in the substrates. Therefore, an additional metallic layer called a bond coat is placed for example, by chemical vapor deposition (CVD), between the substrate and the TBC to improve adhesion of the TBC to the underlying component. In one form, the bond coat is made of a diffusion nickel aluminide or platinum aluminide, whose surface oxidizes to form a protective aluminum oxide scale in addition to improving adherence of the ceramic TBC.

Even with the use of these protective techniques, there remain problems to overcome in extending the operating service temperatures and operating lives of the turbine blade components. There is a large cost to replacing these turbine blade components, especially because of the expensive components used to manufacture such components. As a result, it is beneficial to extract particular needed components from used parts for future use in the manufacture of new parts. For example, platinum group metals (PGM) are often employed in the aviation industry. Because platinum group metals are relatively expensive and are often obtained from sources outside the United States, it is advantageous to recover platinum group metals from parts used in airplanes.

Many advanced gas turbine engine components, especially turbine blades, are coated with platinum modified diffusion aluminide coatings (PtAl). These coatings offer superior environmental protection in oxidation and Type I hot corrosion conditions within a turbine engine. As outlined above, these coatings are also employed as bond coatings beneath physically vapor deposited (PVD) thermal barrier coatings.

The Pt present in PtAl coatings is most often deposited by electroplating. To develop the required PtAl chemistry and structure, about 0.5-0.8 grams of Pt are electroplated onto relatively smaller turbine blades, while up to on the order of 1.5 grams of Pt may be electroplated onto larger blades. After plating, the Pt is incorporated into the coating by diffusion, with the final composition of the predominant coating phase being (Ni,Pt)Al.

A PtAl coating may be removed from a blade if the coating itself or some other feature of the blade does not meet the engineering or quality requirements for the part. In such a case, the coating is stripped, the part reworked and then recoated with PtAl. Turbine blades are also stripped of PtAl coatings after engine operation to enable inspection and repair of the turbine blades.

Stripping of PtAl coatings is accomplished in a variety of manners. As discussed above, PtAl may be removed by dissolving both the aluminum and platinum in strong acids. Platinum could then be recovered by treating the acidic solution containing dissolved platinum salts with a neutralizing base, thereby causing the dissolved platinum and aluminum salts to precipitate and be collected. Other methods, which do not recover platinum, are also known. For example, stripping of PtAl coatings can be accomplished by acid stripping using mineral acids such as hydrochloric, phosphoric, nitric, and mixtures of these acids. The acids react with the coating and dissolve some of the coating constituents, especially Ni. After the reaction, a thin, loosely adherent, black film residue comprising Pt, aluminum oxides and heavy metal oxides of various elements from the substrate material is left behind on the blade. After stripping a number of parts, the stripping solutions become ineffective and are discarded. Most often the acids are neutralized, the metals chemically precipitated out, and the precipitate filtered from the solution. The precipitate, although it contains minor amounts of Pt, is disposed of as solid waste.

The platinum rich residue was removed from stripped turbine blades by mechanical methods such as ultrasonic treatment or vibratory finishing. Traditionally a "cutting" type media has been used in vibratory finishing machines to remove residue. Cutting media consist of abrasive aluminum oxide particles in a soft binder. The binder breaks down, releasing aluminum oxide particles into the vibratory finish machine. Large volumes of sludge are produced. The residue is thus contaminated and diluted by the abrasive media as it breaks down, such that the Pt is no longer economically recoverable. Overflow from wet blast or vibratory finishing machines used to clean blades is treated in a wastewater system, and the solids, although they contain Pt, are disposed of as waste. Methods disclosed herein are advantageous over the above described prior methods because they allow for efficient recovery of platinum.

The present invention improves on the above described prior methods by providing more efficient methods for recovery of platinum from coatings containing platinum aluminide. Thus, in one embodiment, the invention is directed to a method for recovery of platinum from a coating on a component, wherein the coating includes platinum aluminide, the method including: contacting the coating on the component with a reagent solution, the reagent solution including hexafluorosilicic acid, whereby a platinum-rich residue is formed on the component; separating the platinum-rich residue from the component; and collecting the platinum-rich residue.

The present invention is also directed to a method for recovery of platinum from a coating on a component, wherein the coating includes platinum aluminide, the method including: contacting the coating on the component with a reagent solution, the reagent solution including a reactive species, wherein the reactive species is capable of solubilizing an aluminum salt in water, whereby a platinum-rich residue is formed on the component; separating the platinum-rich residue from the component; and collecting the platinum-rich residue.

In the embodiments described herein, separating the platinum-rich residue from the component may include applying a mechanical force to the platinum-rich residue on the component. The mechanical force may be brushing, water jet cleaning, dry-ice blasting, compressed air cleaning, stirring, sparging, ultrasound agitation, vibratory tumbling, or combinations thereof.

In one embodiment, the mechanical force may include vibratory tumbling with tumbling media. Suitable tumbling media may be ceramic media, such as SWECO Tumble Media XC 5/16. During vibratory tumbling in addition to tumbling media, water and, optionally, surfactant may be used. Suitable surfactants include, for example, Triton X-100, Alconox, and 4-(5-Dodecyl) benzenesulfonate. The duration of vibratory tumbling may be from 30 to 120 minutes.

In the embodiments described herein, collecting the platinum-rich residue may include centrifugation. The duration of centrifugation may be from 30 minutes to 8 hours. In one embodiment, the duration of centrifugation is from 30 minutes to 2 hours.

In the embodiments described herein, the separating and the collecting steps may be performed sequentially or concurrently. For example, vibratory tumbling and centrifugation could be performed concurrently, as described below in Example 1.

In one embodiment, the method may further include drying of the platinum rich residue. The duration of drying may be from 1 to 6 hours. The temperature of drying may be from 150° F. to 225° F.

The present invention is also directed to a method for recovery of platinum from a coating on a component, wherein the coating includes platinum aluminide, the method including: contacting the coating on the component with a reagent solution by immersing the component in the reagent solution, the reagent solution including hexafluorosilicic acid, whereby a platinum-rich residue is formed on the component; separating the platinum-rich residue from the component by vibratory tumbling of the component; collecting the platinum-rich residue by centrifugation; and drying the platinum-rich residue.

The present invention is further directed to a method for recovery of platinum from a coating on a component, wherein the coating includes platinum aluminide, the method including: contacting the coating on the component with a reagent solution by immersing the component in the reagent solution, the reagent solution including a reactive species, wherein the reactive species is capable of solubilizing an aluminum salt in water, whereby a platinum-rich residue is formed on the component; separating the platinum-rich residue from the component by vibratory tumbling of the component; collecting the platinum-rich residue by centrifugation; and drying the platinum-rich residue.

In the embodiments described herein, contacting the coating on the component with the reagent solution may include immersing the component in the reagent solution. The reagent solution may be kept at room temperature. In one embodiment, subsequently to contacting of the coating on the component with the reagent solution, the reagent solution may be heated or cooled. Such cooling may be down to 30° C. if ambient temperature is high and/or there is significant heat of reaction during dissolution. Heating may be up to 80° C. Heating the solution increases the dissolution rate, thereby shortening the process cycle time. The duration of contacting of the coating with the reagent solution may vary from 30 minutes to 3 hours. The coated component may or may not be agitated while being contacted with the reagent solution. Such agitation may be done by recirculation, impellor, or sparging.

In the embodiments described herein, the reactive species may be selected from hexafluorosilicic acid, hydrofluoric acid, lactic acid, nitric acid, sulfuric acid, caustic soda, hexafluorozirconic acid, hexafluorotitanic acid, methane sulfonic acid, ammonium bifluoride, and mixtures thereof. Thus, in one embodiment, the reactive species may be hexafluorosilicic acid.

In the embodiments described herein, concentration of the reactive species in the reagent solution may be from about 10 percent to about 100 percent by weight. Thus, hexafluorosilicic acid concentration in the reagent solution may be from about 10 percent to about 35 percent by weight. The remainder of the reagent solution may be any suitable solvent, for example, water.

In the embodiments described herein, the platinum-rich residue may have a platinum content of from about 5 to about 70 percent by weight.

In the embodiments described herein, the method may further including smelting of the platinum-rich residue to isolate platinum. Such smelting processes are well known in the art. The isolated by smelting platinum may have purity of up to 99.999 percent by weight platinum.

This written description uses examples to disclose embodiments of the invention, including the best mode, and also to enable any person skilled in the art to practice the invention, including making and using any devices or systems and performing any incorporated methods. The patentable scope of the invention is not limited to the scope of the provided examples, and may include other examples that occur to those skilled in the art. Such other examples are intended to be within the scope of the claims if they have structural elements or method steps that do not differ from the literal language of the claims, or if they include equivalent structural elements or method steps with insubstantial differences from the literal language of the claims.

EXAMPLES

Example 1

Recovery of Platinum with Hexafluorosilicic Acid

The parts (i.e., components) processed were 47 platinum aluminide coated Rene N5 nickel-based superalloy stage two blades from a jet engine. These parts were loaded into a basket. The basket was lowered into a tank containing a reagent solution of 23 percent by weight hexafluorosilicic acid (with reminder of the reagent solution being water) at 60° C. The solution was agitated by means of a recirculating system. During the process, hydrogen bubbling could be observed, which was confirmation that the aluminum was being leached from the coating. After one hour the bubbling ceased. A platinum-rich smut (i.e., platinum-rich residue) was formed on the surface of the parts. The basket was removed and transferred to a rinse tank. After rinsing with water, the parts were transferred to a vibratory tumbler containing ceramic media SWECO Tumble Media XC 5/16 and water. During this process the platinum-rich smut was removed from the parts and suspended in the water. During tumbling, the aqueous suspension was continuously drawn off and conducted via plumbing to a continuous centrifuge. The effluent water and surfactant were reintroduced into the vibratory tumbler to provide additional smut removal. After 30 minutes the clean parts were removed and the platinum-rich smut was harvested from the centrifuge. This platinum-rich smut was then dried in an oven at 200° C. degrees for 1 hour. The composition of the dried platinum-rich smut was 49 percent platinum by weight. The dried platinum-rich smut was then subjected to a smelting process. The smelting process yielded platinum having purity of 95 percent by weight.

While only certain features of the invention have been illustrated and described herein, many modifications and changes will occur to those skilled in the art. It is, therefore, to be understood that the appended claims are intended to cover all such modifications and changes as falling within the true spirit of the invention.

Throughout this application, various references are referred to. The disclosures of these publications in their entireties are hereby incorporated by reference as if written herein.

What is claimed is:

1. A method for recovery of platinum from a coating on a component, wherein the coating comprises platinum aluminide, the method comprising:
   contacting the coating on the component with a reagent solution, the reagent solution comprising hexafluorosilicic acid, whereby a platinum-rich residue is formed on the component;
   separating the platinum-rich residue from the component; and
   collecting the platinum-rich residue.

2. The method of claim 1, wherein hexafluorosilicic acid concentration in the reagent solution is from about 10 percent to about 35 percent by weight.

3. The method of claim 1, wherein the platinum-rich residue has a platinum content of from about 5 to about 70 percent by weight.

4. The method of claim 1, wherein contacting the coating on the component with the reagent solution comprises immersing the component in the reagent solution.

5. The method of claim 1, wherein, subsequently to contacting of the coating on the component with the reagent solution, the reagent solution is heated or cooled.

6. The method of claim 1, wherein separating the platinum-rich residue from the component comprises applying a mechanical force to the platinum-rich residue on the component, the mechanical force comprising brushing, water jet cleaning, dry-ice blasting, compressed air cleaning, stirring, sparging, ultrasound agitation, vibratory tumbling, or combinations thereof.

7. The method of claim 6, wherein the mechanical force comprises vibratory tumbling with tumbling media.

8. The method of claim 1, wherein collecting the platinum-rich residue comprises centrifugation.

9. The method of claim 1, further comprising drying of the platinum rich residue.

10. A method for recovery of platinum from a coating on a component, wherein the coating comprises platinum aluminide, the method comprising:
    contacting the coating on the component with a reagent solution by immersing the component in the reagent solution, the reagent solution comprising hexafluorosilicic acid, whereby a platinum-rich residue is formed on the component;
    separating the platinum-rich residue from the component by vibratory tumbling of the component;
    collecting the platinum-rich residue by centrifugation; and
    drying the platinum-rich residue.

11. The method of claim 10, wherein hexafluorosilicic acid concentration in the reagent solution is from about 10 percent to about 35 percent by weight.

12. The method of claim 10, wherein the platinum-rich residue has a platinum content of from about 5 to about 70 percent by weight.

13. The method of claim 10, wherein, subsequently to contacting of the coating with the reagent solution, the reagent solution is heated or cooled.

14. The method of claim 10, wherein vibratory tumbling of the component includes use of tumbling media.

15. A method for recovery of platinum from a coating on a component, wherein the coating comprises platinum aluminide, the method comprising:
    contacting the coating on the component with a reagent solution, the reagent solution comprising a reactive species, wherein the reactive species is capable of solubilizing an aluminum salt in water, whereby a platinum-rich residue is formed on the component;
    separating the platinum-rich residue from the component; and
    collecting the platinum-rich residue.

16. The method of claim 15, wherein the reactive species is selected from the group consisting of hexafluorosilicic acid, hydrofluoric acid, lactic acid, nitric acid, sulfuric acid, caustic soda, hexafluorozirconic acid, hexafluorotitanic acid, methane sulfonic acid, ammonium bifluoride, and mixtures thereof.

17. The method of claim 15, wherein concentration of the reactive species in the reagent solution is from about 10 percent to about 100 percent by weight.

18. The method of claim 15, wherein the reactive species is hexafluorosilicic acid.

19. The method of claim 15, wherein the platinum-rich residue has a platinum content of from about 5 to about 70 percent by weight.

20. The method of claim 15, wherein contacting the coating on the component with the reagent solution comprises immersing the component in the reagent solution.

21. The method of claim 15, wherein, subsequently to contacting of the coating on the component with the reagent solution, the reagent solution is heated or cooled.

22. The method of claim 15, wherein separating the platinum-rich residue from the component comprises applying a mechanical force to the platinum-rich residue on the component, the mechanical force comprising brushing, water jet cleaning, dry-ice blasting, compressed air cleaning, stirring, sparging, ultrasound agitation, vibratory tumbling, or combinations thereof.

23. The method of claim 22, wherein the mechanical force comprises vibratory tumbling with tumbling media.

24. The method of claim 15, wherein collecting the platinum-rich residue comprises centrifugation.

25. The method of claim 15, further comprising drying of the platinum rich residue.

26. A method for recovery of platinum from a coating on a component, wherein the coating comprises platinum aluminide, the method comprising:
contacting the coating on the component with a reagent solution by immersing the component in the reagent solution, the reagent solution comprising a reactive species, wherein the reactive species is capable of solubilizing an aluminum salt in water, whereby a platinum-rich residue is formed on the component;
separating the platinum-rich residue from the component by vibratory tumbling of the component;
collecting the platinum-rich residue by centrifugation; and
drying the platinum-rich residue.

27. The method of claim 26, wherein the reactive species is selected from the group consisting of hexafluorosilicic acid, hydrofluoric acid, lactic acid, nitric acid, sulfuric acid, caustic soda, hexafluorozirconic acid, hexafluorotitanic acid, methane sulfonic acid, ammonium bifluoride, and mixtures thereof.

28. The method of claim 26, wherein concentration of the reactive species in the reagent solution is from about 10 percent to about 100 percent by weight.

29. The method of claim 26, wherein the reactive species is hexafluorosilicic acid.

30. The method of claim 26, wherein the platinum-rich residue has a platinum content of from about 5 to about 70 percent by weight.

31. The method of claim 26, wherein, subsequently to contacting of the coating with the reagent solution, the reagent solution is heated or cooled.

32. The method of claim 26, wherein vibratory tumbling of the component includes use of tumbling media.

* * * * *